(12) United States Patent
Loffink et al.

(10) Patent No.: US 7,734,858 B2
(45) Date of Patent: Jun. 8, 2010

(54) FABRIC INTERPOSER FOR BLADE COMPUTE MODULE SYSTEMS

(75) Inventors: John S. Loffink, Austin, TX (US); Sandor T. Farkas, Round Rock, TX (US); Shawn Paul Hoss, Round Rock, TX (US)

(73) Assignee: Dell Products L.P., Round Rock, TX (US)

( * ) Notice: Subject to any disclaimer, the term of this patent is extended or adjusted under 35 U.S.C. 154(b) by 1077 days.

(21) Appl. No.: 11/412,279

(22) Filed: Apr. 27, 2006

(65) Prior Publication Data

US 2007/0255857 A1 Nov. 1, 2007

(51) Int. Cl.
*G06F 13/20* (2006.01)
*G06F 3/00* (2006.01)

(52) U.S. Cl. .............. 710/313; 710/36; 710/2; 370/357; 711/114

(58) Field of Classification Search ............. 710/36–45, 710/2, 313; 370/217, 357–360; 711/114
See application file for complete search history.

(56) References Cited

U.S. PATENT DOCUMENTS

| | | | |
|---|---|---|---|
| 5,878,246 A | 3/1999 | Hildenbrand | ............... 395/500 |
| 6,363,452 B1 | 3/2002 | Lach | ........................... 710/316 |
| 6,608,761 B2 | 8/2003 | Wachel | ....................... 361/785 |
| 6,824,393 B2 | 11/2004 | Debord et al. | ................. 439/65 |
| 6,932,617 B2 | 8/2005 | Debord et al. | ................. 439/65 |
| 7,339,785 B2 * | 3/2008 | Colborn et al. | ........ 361/679.33 |
| 7,525,957 B2 * | 4/2009 | Scherer et al. | .............. 370/360 |
| 2003/0184458 A1* | 10/2003 | Calvignac et al. | ........... 341/102 |
| 2007/0047536 A1* | 3/2007 | Scherer et al. | .............. 370/360 |
| 2007/0083707 A1* | 4/2007 | Holland et al. | .............. 711/114 |
| 2007/0237071 A1* | 10/2007 | Chiasson et al. | ............ 370/217 |

* cited by examiner

*Primary Examiner*—Christohper B Shin
(74) *Attorney, Agent, or Firm*—Baker Botts L.L.P.

(57) ABSTRACT

An interposer module may be used between a unified architecture blade compute module and a mid-plane of a present technology blade compute module system. The interposer module may contain input-output controllers for desired input-output fabrics. The mid-plane couples these input-output controllers to associated input-output fabric switches. The same unified architecture blade compute module may also be used without the interposer module in a new technology blade compute module system having multi-context fabric input-output controllers. The multi-context fabric input-output controllers may be coupled to the unified architecture blade compute modules of the information handling system by a switch such as a PCI Express (PCIe) switch.

25 Claims, 5 Drawing Sheets

Figure 1

Figure 2 (Present Technology)

*Figure 3 (Present Technology)*

*Figure 4 (Present Technology)*

FABRIC INTERPOSER FOR BLADE COMPUTE MODULE SYSTEMS

TECHNICAL FIELD

The present disclosure relates generally to information handling systems and, more particularly, to input-output fabric interposers for blade compute module systems.

BACKGROUND

As the value and use of information continues to increase, individuals and businesses seek additional ways to process and store information. One option available to users are information handling systems. An information handling system generally processes, compiles, stores, and/or communicates information or data for business, personal, or other purposes, thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems, e.g., computer, personal computer workstation, portable computer, computer server, print server, network router, network hub, network switch, storage area network disk array, RAID disk system and telecommunications switch.

As consumer demand increases for smaller and denser information handling systems, manufacturers strive to integrate more computer components into a smaller space. This integration has led to the development of several applications, including high density compute modules. High density compute modules provide the computer processing resources of several computers in a small amount of space. A typical arrangement for a high density compute module system includes a shared power supply system, a management module, shared input-output (I/O) interfaces, a connection board (e.g., a back-plane or mid-plane) and the compute modules.

Blade compute modules, or "blades," are miniaturized compute modules that typically are powered from a common power supply system and are cooled by a cooling system within a multi-compute module cabinet. Typically, a blade includes a circuit board with one or more processors, memory, a connection port, and possibly a disk drive for storage. By arranging a plurality of blades like books on a shelf in the multi-compute module cabinet, a high density multi-compute module system achieves significant cost and space savings over a plurality of conventional computers in separate enclosures. These savings result directly from the sharing of common resources, e.g., I/O interfaces, power supplies, cooling systems, enclosures, etc., and the reduction of space required by this type of multi-compute module system while providing a significant increase in available computer processing power.

Blades may be adaptable for a number of different input-output (I/O) interface protocols in a multi-compute module information handling system. Each of these I/O interface protocols may be interchanged to a user specified fabric, e.g., Ethernet network interface controller (NIC), Fibre Channel (FC), InfiniBand, etc., by a modular daughter card associated with the respective blade, e.g., the modular daughter card may plug into a connector on the blade. Each daughter card connector is routed to a specific I/O interface module. All of the daughter cards connected to the specific I/O interface module must have the same fabric as that I/O interface module for proper operation thereof.

SUMMARY

A better way to connect blades to I/O interface modules is to use a unified fabric architecture such as shared PCI Express or PCIe. Such unified fabrics, e.g., PCIe, enable a lower cost architecture for blades. Fabric input-output controllers such as the aforementioned modular daughter cards are no longer necessary nor desired. Instead of the expensive fabric daughter cards, common shared fabric input-output controllers (IOCs), e.g., multi-context capable input-output controllers (IOCs), may be coupled to any of the unified fabric architecture blades through, for example, a PCIe switch(es). The multiple and expensive fabric switches may be moved outside of blade chassis and replaced with a PCIe switch and virtualized IOCs supporting multiple blades concurrently. Unfortunately, a lack of available multi-context capable IOCs and supporting software infrastructure makes a blade system having unified fabric architecture presently unfeasible.

What is needed and desired is a way of using present technology mid-plane and specific fabric I/O interface modules with unified fabric architecture blade compute modules in an information handling system. According to teachings of this disclosure, an interposer board may be used as an electrical and mechanical interface between a present technology information handling system chassis/mid-plane and at least one blade compute module having at least one PCIe interface for external input-output (I/O) devices. The interposer board may provide power and PCIe I/O connectivity to the at least one blade compute module. The interposer board may also comprise IOCs to implement various I/O fabrics with corresponding connections to the mid-plane of the chassis in the information handling system blade compute module system. The interposer board may also provide a form factor so that the newer and smaller unified fabric architecture blade compute modules may physically and electrically fit into a standard present technology chassis and mid-plane of the information handling system blade compute module system.

Thus, new technology unified fabric architecture blade compute modules may be qualified and used in present technology information handling system blade compute module systems for both additions and replacements of the present technology blade compute modules. When unified architecture information handling blade compute module systems become more prevalent, then the same qualified unified architecture blade compute module design may be used therein by just not using the interposer board, and directly connecting the unified architecture blade to the mid-plane board of the unified architecture information handling blade compute module system. Since the mid-plane board fabric lanes are all high speed differential pairs that are compatible with PCIe, implementation of a general PCIe connection topology of the mid-plane board may be easily accomplished.

According to a specific example embodiment of this disclosure, an information handling system having unified fabric architecture may comprise: at least one unified fabric architecture blade compute module having a plurality of unified fabric architecture buses; a first connector on the at least one unified fabric architecture blade compute module; an interposer module having at least one input-output (I/O) controller, a second connector adapted to mate with the first connector and a third connector adapted to mate with a mid-plane of an information handling blade compute module system; and at least one I/O fabric switch coupled to a respective one of the at least one I/O controller through the mid-plane.

According to another specific example embodiment of this disclosure, an information handling system having unified architecture may comprise: at least one unified fabric architecture blade compute module having a plurality of unified fabric architecture buses; a connector on the at least one unified fabric architecture blade compute module; a mid-plane of an information handling blade compute module system adapted to couple to the connector of the at least one unified fabric architecture blade compute module; a unified fabric architecture switch coupled to the plurality of unified fabric architecture buses through the connector and mid-plane; and at least one multi-context input-output controller coupled to the unified fabric architecture switch.

According to yet another specific example embodiment of this disclosure, a method for using a unified fabric architecture blade compute module in an information handling blade compute module system may comprise the steps of: providing a unified fabric architecture blade compute module having a plurality of unified fabric architecture buses; providing an information handling blade compute module system with a mid-plane having specific input-output fabric buses; and coupling a fabric interposer module between the unified fabric architecture blade compute module and the mid-plane of the information handling blade compute module system; wherein the fabric interposer module has at least one input-output (I/O) fabric controller with an interface to at least one of the unified fabric architecture buses of the unified fabric architecture blade compute module, and an interface to a one of the specific input-output fabric buses of the information handling blade compute module system.

According to still another specific example embodiment of this disclosure, a method for using a unified fabric architecture blade compute module in an information handling blade compute module system may comprise the steps of: providing at least one unified fabric architecture blade compute module having a plurality of first unified fabric architecture buses; providing a connector on the at least one unified fabric architecture blade compute module; providing a mid-plane of an information handling blade compute module system adapted to couple to the connector of the at least one unified fabric architecture blade compute module; providing a unified fabric architecture switch coupled to the plurality of first unified fabric architecture buses through the connector and mid-plane; and providing at least one multi-context input-output controller coupled to the unified fabric architecture switch; wherein the at least one unified fabric architecture blade compute module communicates with the unified fabric architecture switch over the plurality of first unified fabric architecture buses, and the unified fabric architecture switch communicates with the at least one multi-context input-output controller over a plurality of second unified fabric architecture buses.

BRIEF DESCRIPTION OF THE DRAWINGS

A more complete understanding of the present disclosure thereof may be acquired by referring to the following description taken in conjunction with the accompanying drawings wherein.

While the present disclosure is susceptible to various modifications and alternative forms, specific example embodiments thereof have been shown in the drawings and are herein described in detail. It should be understood, however, that the description herein of specific example embodiments is not intended to limit the disclosure to the particular forms disclosed herein, but on the contrary, this disclosure is to cover all modifications and equivalents as defined by the appended claims.

DETAILED DESCRIPTION

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU), hardware or software control logic, read only memory (ROM), and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Referring now to the drawings, the details of specific example embodiments are schematically illustrated. Like elements in the drawings will be represented by like numbers, and similar elements will be represented by like numbers with a different lower case letter suffix.

Figure 1:
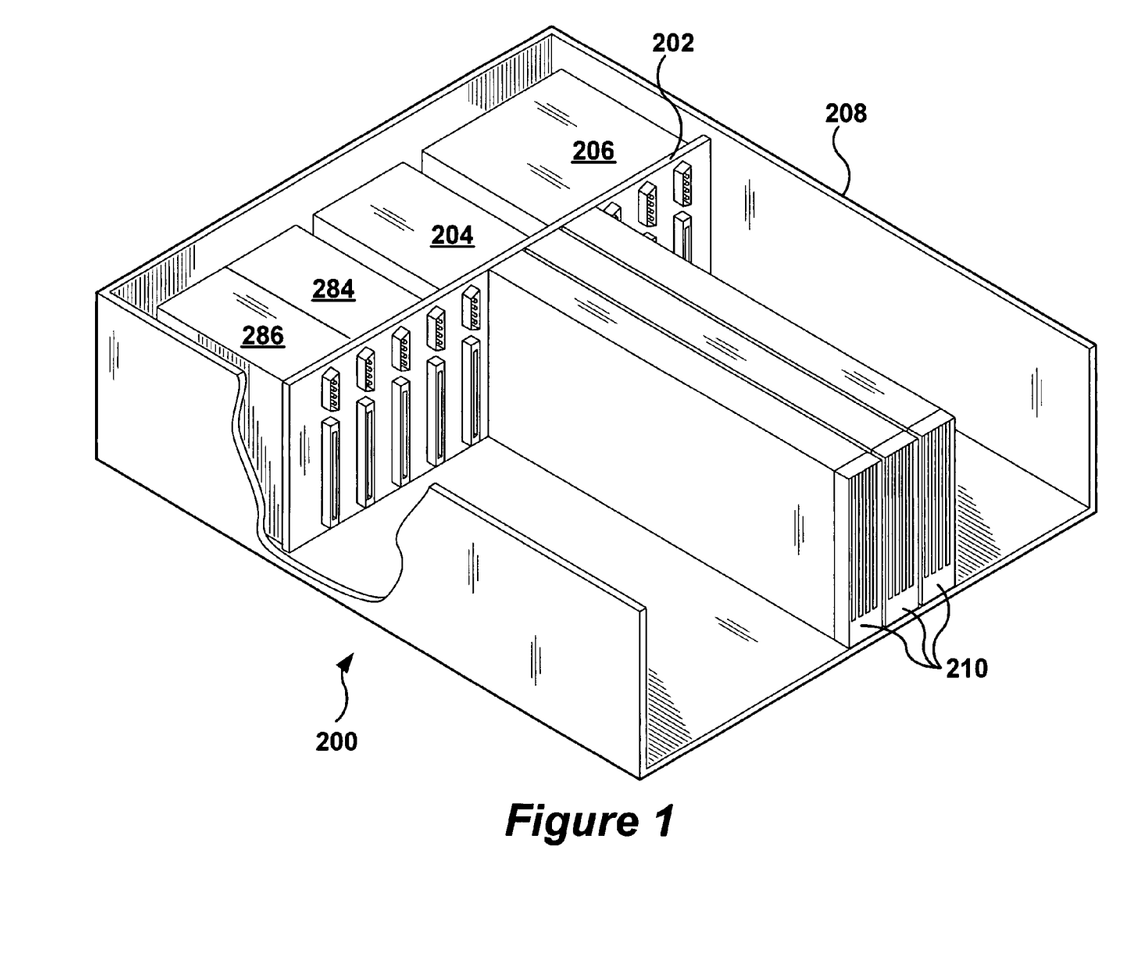
FIG. 1 is a schematic perspective view of a high density information handling blade compute module system.

Referring to FIG. 1, depicted is a schematic perspective view of a high density information handling blade compute module system. The information handling blade compute module system, generally represented by the numeral 200, comprises at least one blade compute module (BCM) 210, a power and signal distribution board 202, at least one power supply unit (PSU) 206, at least one input-output (I/O) interfaces 284 and 286, e.g., I/O fabric switches, and a chassis management controller (CMC) 204. In certain embodiments, one example of an information handling blade compute module system 200 includes a high density blade compute module system 200 that may form a part of a component rack system (not expressly shown). Typically, the high density blade compute module system 200 may include an enclosure or chassis 208 in which the at least one PSU 206, I/O fabric switches 284 and 286, CMC 204, power and signal distribution board 202 and the at least one BCM 210 may be enclosed therein. Each BCM 210 may include a blade management controller (BMC) 212 (see FIG. 2).

Although FIG. 1 depicts a mid-plane power and signal distribution board 202 as being placed between CMC 204 and the at least one BCM 210, the PDB 202 may be located anywhere in the information handling system 200, even external to the chassis 208. In alternate embodiments, the power and signal distribution board 202 may be located along the back of the information handling blade compute module system 200 and may be referred to as a power and signal distribution back-plane (not shown).

The high density blade compute module system 200 may be coupled to other computer components such as keyboards, video displays and pointing devices (not expressly shown). Typically, the information handling system 200 may include more than one PSU 206 such that a redundant power source may be provided. The PSU 206 may supply an output, e.g., an electrical voltage(s) for the at least one BCM 210. Generally, the PSU 206 output is coupled through the power and signal distribution board, e.g., mid-plane, 202 for distribution to the at least one BCM 210. The at least one I/O interfaces 284 and 286 may be coupled to various I/O fabrics associated with the BCMs 210 represented by various data transfer communications protocols, e.g., Ethernet, Fibre Channel, InfiniBand, etc. Thereby allowing the information handling system 200 to communicate through the at least one I/O fabric switches 284 and 286 to the desired communications protocol(s). Each of the at least one I/O fabric switches 284 and 286 may be coupled to any or all of the BCMs 210 over appropriate communications protocol fabrics selected by input-output controllers (IOCs) cards 264 and/or 268 associated with each of the BCMs 210 (see FIG. 2).

Figure 2:
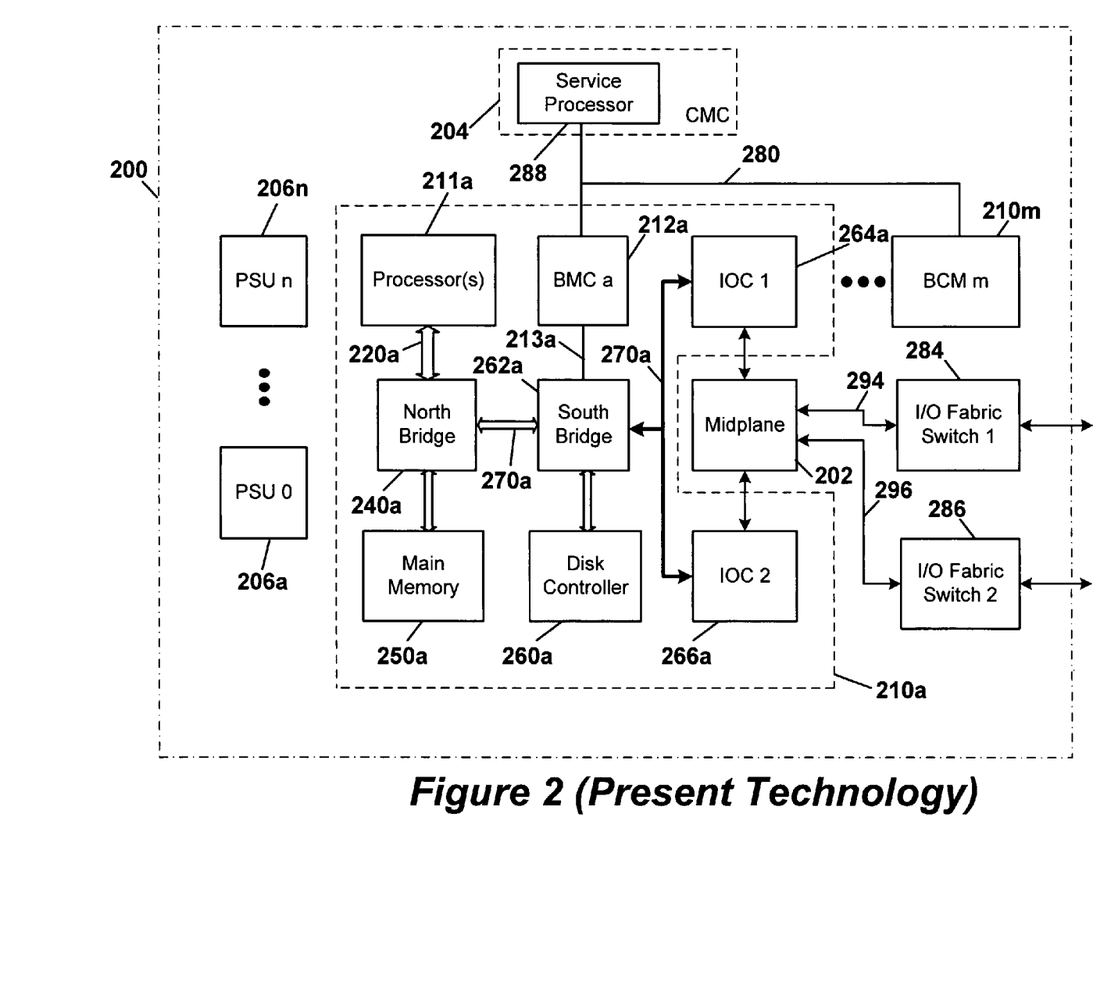
FIG. 2 is a schematic block diagram of a typical present technology information handling blade compute module system.

Referring to FIG. 2, depicted is a typical present technology information handling blade compute module system having electronic components mounted on at least one printed circuit board (PCB) (motherboard not shown) and communicating data and control signals therebetween over signal buses. The information handling compute module system, generally referenced by the numeral 200, may comprise one or more blade compute modules (BCMs) 210a-210m. For each of the blade compute modules (BCMs) 210a-210m (for illustrative purposes only components for BCM 210a are shown) there may be a processor(s) 211a, a north bridge 240a, which may also be referred to as a memory controller hub or a memory controller that is coupled to a main system memory 250a, and the blade management controller (BMC) 212a. The north bridge 240a is coupled to the processor(s) 211a via the host bus 220a. The north bridge 240a is generally considered an application specific chip set that provides connectivity to various buses, and integrates other system functions such as a memory interface. For example, an Intel 820E and/or 815E chip set, available from the Intel Corporation of Santa Clara, Calif., provides at least a portion of the north bridge 240a. The chip set may also be packaged as an application specific integrated circuit (ASIC). The north bridge 240a typically includes functionality to couple the main system memory 250a to other devices within the information handling system 200. Thus, memory controller functions such as main memory control functions typically reside in the north bridge 240a. In addition, the north bridge 240a provides bus control to handle transfers between the host bus 220a and a second bus(es), e.g., PCI bus 270a. A third bus(es) 268a may also comprise other industry standard buses or proprietary buses, e.g., ISA, SCSI, I²C, SPI, USB, LPC buses through a south bridge(s) (bus interface) 262a. The BMC 212a may be coupled to the blade 210a with a low pin count (LPC) bus 213a through the south bridge 262a. Each BMC 212 of the blades 210 may be coupled to a CMC service processor 288 in the CMC 204 over, for example but not limited to, a standard Ethernet link 280. The CMC 204 may control various blade system chassis functions and may be used to communicate to each BMC 212 of the blades 210 in the blade compute module system 200.

The I/O fabric switches 284 and 286 may be used to couple to specific fabric input-output interfaces (not shown) that may be common to all of the BCMs 210. These fabric input-output interfaces may be used for communicating with external networks, disk drives, etc., over various communications protocols, e.g., Ethernet, Fibre Channel, InfiniBand, etc. Each of the I/O fabric switches 284 and 286 may have fabric buses 294 and 296, respectively, that are unique to the I/O interface fabric types. Each of the BCMs 210 may communicate to desired ones of the I/O fabric switches 284 and/or 286 with IOCs 264 and/or 266. The IOCs 264a and 266a may be coupled to the south bridge 262a data bus 270a. The IOCs 264a and 266a may be coupled to the respective ones of the fabric buses 294 and 296 through the mid-plane 202.

Figure 3:
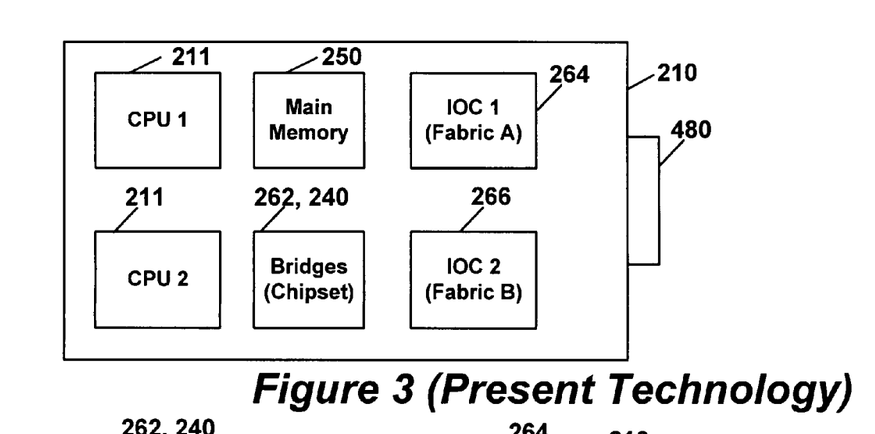
FIG. 3 is a schematic plan view of a present technology blade compute module.
Figure 4:
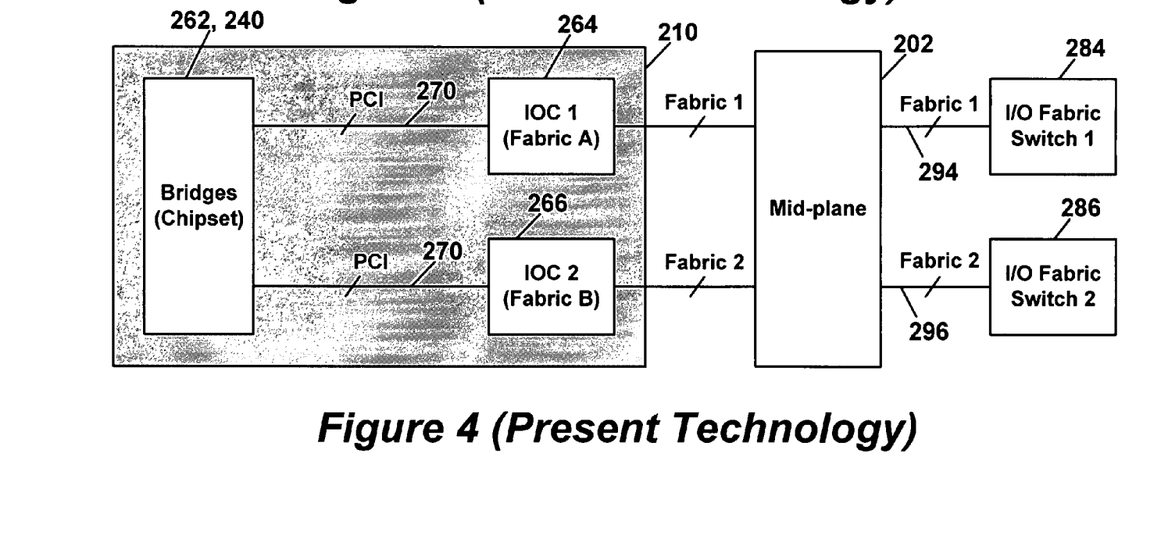
FIG. 4 is a schematic block diagram of the blade compute module shown in FIG. 3 and coupled to other parts of a high density information handling blade compute module system.

Referring now to FIGS. 3 and 4, depicted is a schematic plan view (FIG. 3) of a present technology blade compute module, and a schematic block diagram (FIG. 4) of the blade compute module shown in FIG. 3, coupled to other parts of a high density information handling blade compute module system. The blade compute module (or blade) 210 has specific local IOCs 264 and 266 for each fabric desired. Requiring specific local IOCs 264 and 266 on each blade 210 is costly and also requires I/O fabric switches 284 and 286. The local IOCs 264 and 266 on each blade 210, and the I/O fabric switches 284 and 286 add complexity to the blade 210, and information handling blade compute module system 200, and are expensive. The blade 210 has an edge connector 480 adapted for coupling the blade 210 to the mid-plane 202.

Figure 5:
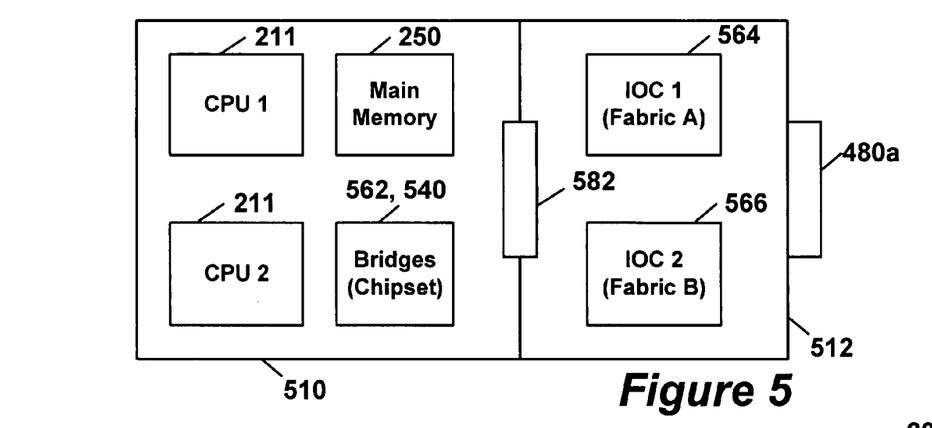
FIG. 5 is a schematic plan view of a blade compute module and interposer module, according to a specific example embodiment of the present disclosure.
Figure 6:
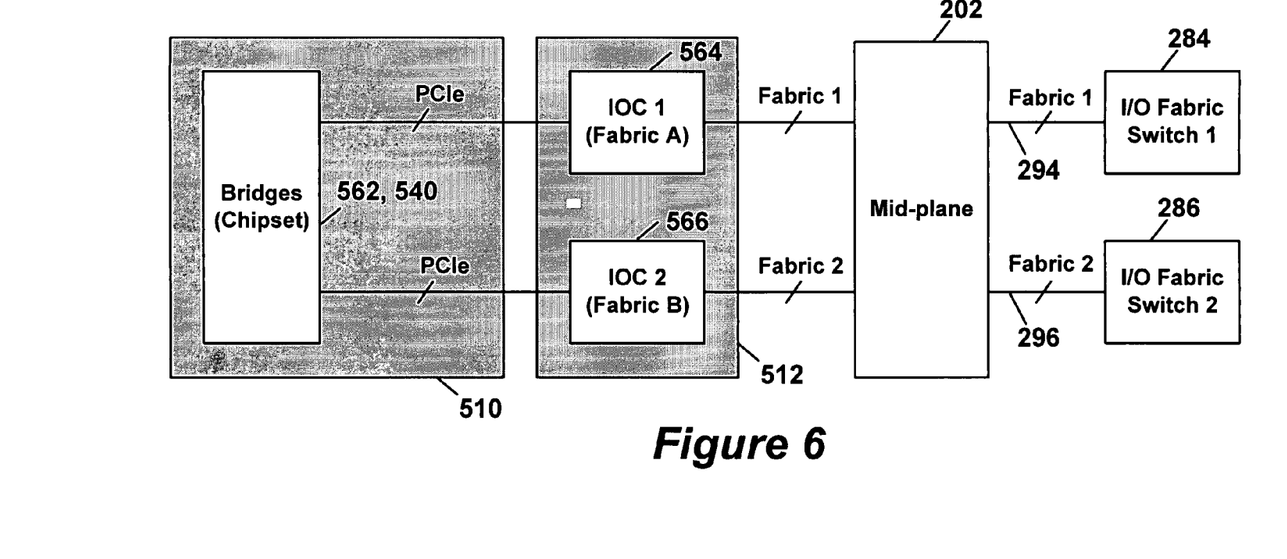
FIG. 6 is a schematic block diagram of the blade compute module and interposer module shown in FIG. 5, and coupled to other parts of a high density information handling blade compute module system.

Referring now to FIGS. 5 and 6, depicted is a schematic plan view (FIG. 5) of a blade compute module and interposer module, and a schematic block diagram (FIG. 6) of the blade compute module and interposer module shown in FIG. 5, coupled to other parts of a high density information handling blade compute module system, according to a specific example embodiment of the present disclosure. A blade compute module 510 is coupled to an interposer module 512 over a plurality of PCIe links, wherein each of the plurality of PCIe links may comprise a plurality of lanes. The blade compute module 510 may connect to the interposer module 512 through a connector 582. The interposer module 512 may comprise IOC 564 for fabric A and IOC 566 for fabric B. One or more IOCs for different fabrics may be on the interposer module 512. The IOCs 564 and 566 are connected to the mid-plane 202 through an edge connector 480a.

The I/O fabric switches 284 and 286 may be used to couple to specific fabric input-output interfaces (not shown) that may be common to all of the BCMs 510. These fabric input-output interfaces may be used for communicating with external networks, disk drives, etc., over various communications protocols, e.g., Ethernet, Fibre Channel, InfiniBand, etc. Each of the I/O fabric switches 284 and 286 may have fabric buses 294 and 296, respectively, that are unique to the I/O interface fabric types. Each of the BCMs 510 may communicate to desired ones of the I/O fabric switches 284 and/or 286 with IOCs 564 and/or 566. The IOCs 564 and 566 may be coupled to the south bridge 562 data bus, e.g., PCIe links, wherein each of the PCIe links may comprise a plurality of lanes. The IOCs 564 and 566 may be coupled to the respective ones of the fabric buses 294 and 296 through the mid-plane 202.

The blade 510 may now be a lean unified architecture blade compute module that may be used in combination with the interposer module 512 for operation in a present technology information handling blade compute module system 200 without modification to the mid-plane 202, I/O fabric switches 284 and 286, and existing software, e.g., fabric drivers and I/O stacks. Since qualification of new architecture blade compute modules 510 are much more complex and time consuming then qualification of far simpler interposer modules 512. This specific example embodiment of the present disclosure may be used as an intermediate step in designing and testing blade compute modules 510 for a lower cost, more universal unified fabric information handling blade compute module systems.

Figure 7:
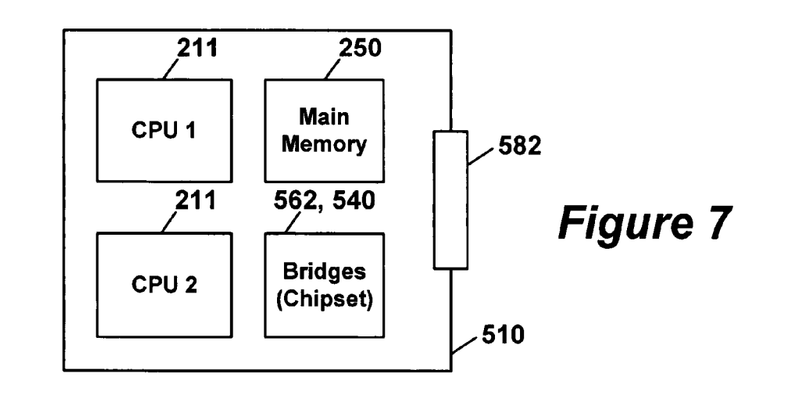
FIG. 7 is a schematic plan view of the blade compute module, according to a specific example embodiment of the present disclosure.
Figure 8:
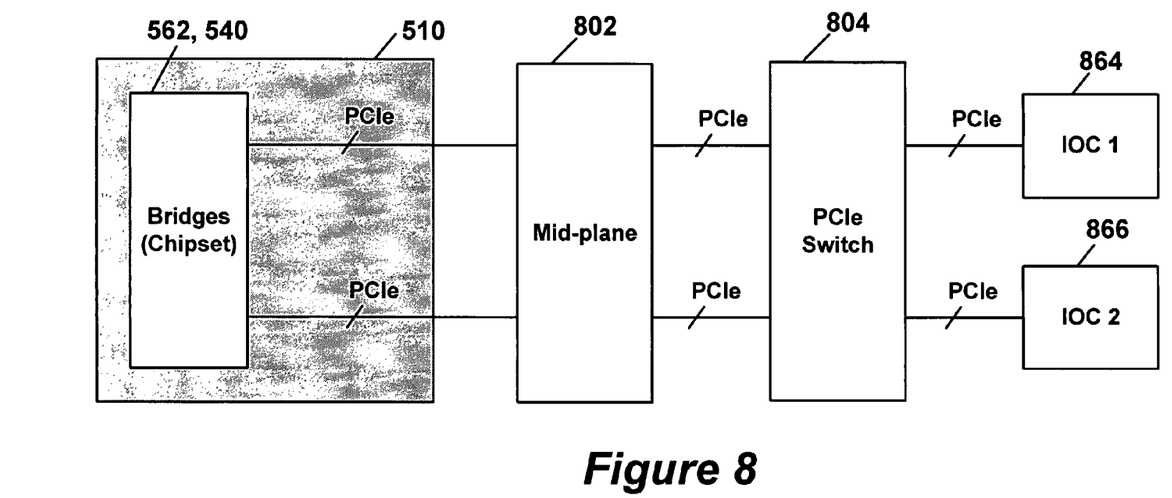
FIG. 8 is a schematic block diagram of the blade compute module shown in FIG. 7, coupled to other parts of a high density unified fabric information handling blade compute module system, according to another specific example embodiment of the present disclosure.

Referring now to FIGS. 7 and 8, depicted is a schematic plan view (FIG. 7) of a blade compute module, and a schematic block diagram (FIG. 8) of the blade compute module shown in FIG. 7, coupled to other parts of a high density unified fabric information handling blade compute module system, according to another specific example embodiment of the present disclosure. A blade compute module 510 is coupled with a connector 582 to a mid-plane 802 through a plurality of PCIe links, wherein each of the PCIe links may comprise a plurality of lanes. The mid-plane 582 may be coupled to a PCIe switch 804, and the PCIe switch 804 may be coupled to a plurality of multi-context input-output controllers, e.g., IOC 864 and IOC 866.

The IOC 864 and the IOC 866 may couple to specific fabric input-output interfaces (not shown) that may be common to all of the BCMs 510. These fabric input-output interfaces may be used for communicating with external networks, disk drives, etc., over various communications protocols, e.g., Ethernet, Fibre Channel, InfiniBand, etc. Each of the BCMs 510 may communicate to desired ones of the IOC 864 and the IOC 866 with the PCIe switch 804. The PCIe switch 804 may be coupled to the south bridge 562 data bus, e.g., PCIe data buses.

Advantages of the unified architecture depicted in FIGS. 7 and 8 are: the interposer module is no longer necessary, the blade 510 is connected directly to the mid-plane 802 through the plurality of PCIe links, each of the plurality of PCIe links may comprise a plurality of lanes, and the I/O fabric switches 284 and 286 may be replaced by the multi-context IOCs 864 and 866.

According to the teachings of this disclosure, a concurrent product set of unified architecture blade compute modules comprising a plurality of PCIe links, wherein each of the plurality of PCIe links may comprise a plurality of lanes. The unified architecture blade compute modules may be used for present technology information handling compute module systems by using an interposer module 512 (FIGS. 5 and 6), and for new unified architecture information handling compute module systems by using only the blade 510 and a PCIe compatible mid-plane that may couple the blade 510 PCIe links to a PCIe switch 804. The PCIe switch 804 may select an appropriate multi-context IOC, e.g., IOCs 864 and 866, for a desired input-output protocol requirement.

While embodiments of this disclosure have been depicted, described, and are defined by reference to example embodiments of the disclosure, such references do not imply a limitation on the disclosure, and no such limitation is to be inferred. The subject matter disclosed is capable of considerable modification, alteration, and equivalents in form and function, as will occur to those ordinarily skilled in the pertinent art and having the benefit of this disclosure. The depicted and described embodiments of this disclosure are examples only, and are not exhaustive of the scope of the disclosure.

What is claimed is:

1. An information handling system having unified fabric architecture, said system comprising:
    at least one unified fabric architecture blade compute module having a plurality of unified fabric architecture buses;
    a first connector on the at least one unified fabric architecture blade compute module;
    an interposer module having at least one input-output (I/O) controller, a second connector mated with the first connector and a third connector mated with a mid-plane of an information handling blade compute module system; and
    at least one I/O fabric switch coupled to a respective one of the at least one I/O controller through the mid-plane.

2. The information handling system according to claim 1, further comprising an I/O interface coupled to the at least one I/O fabric switch.

3. The information handling system according to claim 2, wherein the I/O interface is selected from the group consisting of an Ethernet I/O interface, a Fibre Channel I/O interface, and an InfiniBand I/O interface.

4. The information handling system according to claim 1, wherein the plurality of unified fabric architecture buses are a plurality of PCI Express (PCIe) links.

5. The information handling system according to claim 4, wherein each of the plurality of PCIe links comprise a plurality of lanes.

6. The information handling system according to claim 4, wherein the at least one unified fabric architecture blade compute module is coupled to the at least one input-output (I/O) controller of the interposer module with respective ones of the plurality of PCIe links.

7. An information handling system having unified architecture, said system comprising:
    at least one unified fabric architecture blade compute module having a plurality of unified fabric architecture buses;
    a connector on the at least one unified fabric architecture blade compute module;
    a mid-plane of an information handling blade compute module system coupled to the connector of the at least one unified fabric architecture blade compute module;
    a unified fabric architecture switch coupled to the plurality of unified fabric architecture buses through the connector and mid-plane; and
    at least one multi-context input-output controller coupled to the unified fabric architecture switch.

8. The information handling system according to claim 7, further comprising an I/O interface coupled to the at least one multi-context input-output controller.

9. The information handling system according to claim 8, wherein the I/O interface is selected from the group consisting of an Ethernet I/O interface, a Fibre Channel I/O interface, and an InfiniBand I/O interface.

10. The information handling system according to claim 7, wherein the plurality of unified fabric architecture buses are a plurality of PCI Express (PCIe) links.

11. The information handling system according to claim 10, wherein each of the plurality of PCIe links comprise a plurality of lanes.

12. The information handling system according to claim 10, wherein the unified fabric architecture switch is a PCIe switch.

13. A method for using a unified fabric architecture blade compute module in an information handling blade compute module system, said method comprising the steps of:
    providing a unified fabric architecture blade compute module having a plurality of unified fabric architecture buses;
    providing an information handling blade compute module system with a mid-plane having specific input-output fabric buses; and
    coupling a fabric interposer module between the unified fabric architecture blade compute module and the mid-plane of the information handling blade compute module system;
    wherein the fabric interposer module has at least one input-output (I/O) fabric controller with an interface to at least one of the unified fabric architecture buses of the unified fabric architecture blade compute module, and an interface to a one of the specific input-output fabric buses of the information handling blade compute module system.

14. The method according to claim 13, further comprising the step of coupling at least one I/O fabric switch to the mid-plane, wherein the at least one I/O fabric switch is coupled to a respective one of the specific input-output fabric buses.

15. The method according to claim 14, further comprising the step of coupling an I/O interface to the at least one I/O fabric switch.

16. The method according to claim 15, wherein the at least one I/O interface is selected from the group consisting of an Ethernet I/O interface, a Fibre Channel I/O interface, and an InfiniBand I/O interface.

17. The method according to claim 13, wherein the unified fabric architecture buses are PCI Express (PCIe) links.

18. The method according to claim 17, wherein each of the PCIe links comprise a plurality of lanes.

19. The method according to claim 17, wherein the unified architecture blade compute module is coupled to the at least one I/O fabric controller of the interposer module with the PCIe links.

20. A method for using a unified fabric architecture blade compute module in an information handling blade compute module system, said method comprising the steps of:
    providing at least one unified fabric architecture blade compute module having a plurality of first unified fabric architecture buses;
    providing a connector on the at least one unified fabric architecture blade compute module;
    providing a mid-plane of an information handling blade compute module system coupled to the connector of the at least one unified fabric architecture blade compute module;
    providing a unified fabric architecture switch coupled to the plurality of first unified fabric architecture buses through the connector and mid-plane; and
    providing at least one multi-context input-output controller coupled to the unified fabric architecture switch;
    wherein the at least one unified fabric architecture blade compute module communicates with the unified fabric architecture switch over the plurality of first unified fabric architecture buses, and the unified fabric architecture switch communicates with the at least one multi-context input-output controller over a plurality of second unified fabric architecture buses.

21. The method according to claim 20, further comprising an I/O interface coupled to the at least one multi-context input-output controller.

22. The method according to claim 21, wherein the I/O interface is selected from the group consisting of an Ethernet I/O interface, a Fibre Channel I/O interface, and an InfiniBand I/O interface.

23. The method according to claim 20, wherein the plurality of first and second unified fabric architecture buses are PCI Express (PCIe) links.

24. The method according to claim 23, wherein each of the PCIe links comprise a plurality of lanes.

25. The method according to claim 23, wherein the unified fabric architecture switch is a PCIe switch.

* * * * *